(12) United States Patent
Tanabe (10) Patent No.: US 11,823,422 B2
(45) Date of Patent: Nov. 21, 2023

(54) IMAGE PROCESSING APPARATUS, CONTROL METHOD OF THE SAME, AND STORAGE MEDIUM

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 412 days.

(21) Appl. No.: 17/152,395

(22) Filed: Jan. 19, 2021

(65) Prior Publication Data

US 2021/0233283 A1 Jul. 29, 2021

(30) Foreign Application Priority Data

Jan. 23, 2020 (JP) .................. 2020-009443

(51) Int. Cl.
| | |
|---|---|
| *G06T 9/00* | (2006.01) |
| *G06N 3/08* | (2023.01) |
| *G06T 3/40* | (2006.01) |
| *G06N 3/045* | (2023.01) |

(52) U.S. Cl.
CPC .......... *G06T 9/002* (2013.01); *G06N 3/045* (2023.01); *G06N 3/08* (2013.01); *G06T 3/4046* (2013.01)

(58) Field of Classification Search
CPC ........ G06N 20/00; G06N 20/20; G06N 3/045; G06N 3/08; G06N 3/088; G06N 5/01
USPC ........................................ 382/100
See application file for complete search history.

(56) References Cited

U.S. PATENT DOCUMENTS

| | | | |
|---|---|---|---|
| 2003/0212944 A1* | 11/2003 | Kondo | H04N 19/98 |
| | | | 714/779 |
| 2012/0154520 A1* | 6/2012 | Putraya | H04N 1/3876 |
| | | | 348/E7.001 |
| 2020/0145661 A1* | 5/2020 | Jeon | H04N 19/136 |

FOREIGN PATENT DOCUMENTS

JP 2011-229013 A 11/2011

* cited by examiner

*Primary Examiner* — Ajibola A Akinyemi
(74) *Attorney, Agent, or Firm* — Cowan, Liebowitz & Latman, P.C.

(57) ABSTRACT

An image processing apparatus obtains a degree of degradation for blocks in an encoded image obtained by encoding an input image, decodes the encoded image; and executes image recovery processing on a block in a decoded image obtained by the decoding. The image processing apparatus, switches, depending on the degree of degradation of the blocks in the encoded image, whether or not the image recovery processing using a first neural network is executed on each block in the decoded image.

14 Claims, 7 Drawing Sheets

IMAGE PROCESSING APPARATUS, CONTROL METHOD OF THE SAME, AND STORAGE MEDIUM

BACKGROUND OF THE INVENTION

Field of the Invention

The present invention relates to an image processing apparatus, a control method of the same, and a storage medium.

Description of the Related Art

Image processing apparatuses, such as digital camera, that employ encoding technology to compress image data are known. Such encoding technology is used to develop or compression encode a moving image signal obtained by an image capture unit and record a compression encoded image file on a recording medium.

When encoding technology is applied to image data, the image quality of image data after encoding is degraded compared to the image quality of the image data before encoding. Technology for reducing such image quality degradation of image data after encoding is known (Japanese Patent Laid-Open No. 2011-229013). In Japanese Patent Laid-Open No. 2011-229013, technology is described that reduces degradation after encoding by comparing a signal element with a training signal using a YUV signal prior to encoding used as a reference signal and correcting the YUV signal according to flag information indicating a correction section of signals to be corrected.

However, in recent years, various technologies have been developed involving the application of machine learning using a neural network to image processing, and technology that applies machine learning to an image signal with degraded image quality to recover the image quality of the image signal is also being looked into.

Calculations using a neural network typically require an enormous number of product and sum calculations. Integrated devices have limits to the processing capacity and resources that can be installed. Thus, there are limits to the calculations that can be executed using a neural network in such an integrated device. For this reason, there is a demand for a way to reduce the amount of calculations when using a neural network in image processing. Regarding this, the technology described above in Japanese Patent Laid-Open No. 2011-229013 corrects image data by comparing signal elements and does not take in account image recovery processing using a neural network after decoding.

SUMMARY OF THE INVENTION

The present disclosure has been made in consideration of the aforementioned issues, and realizes a technology capable of reducing the amount of calculations in recovery processing when executing image recovery processing using a neural network after decoding.

In order to solve the aforementioned problems, one aspect of the present disclosure provides an image processing apparatus comprising: one or more processors; and a memory storing instructions which, when the instructions are executed by the one or more processors, cause the image processing apparatus to function as: an obtaining unit configured to obtain a degree of degradation for blocks in an encoded image obtained by encoding an input image; a decoding unit configured to decode the encoded image; and a recovery unit configured to execute image recovery processing on a block in a decoded image obtained by decoding via the decoding unit, wherein the recovery unit, depending on the degree of degradation of the blocks in the encoded image, switches whether or not the image recovery processing using a first neural network is executed on each block in the decoded image.

Another aspect of the present disclosure provides, an image processing apparatus comprising: one or more processors; and a memory storing instructions which, when the instructions are executed by the one or more processors, cause the image processing apparatus to function as: an encoding unit configured to output an encoded image obtained by encoding an input image; a determining unit configured to determine a degree of degradation for blocks in the encoded image; and a recording unit configured to record, together with the encoded image, flag information indicative of whether or not image recovery processing using a first neural network is executed on each block in a decoded image obtained by decoding the encoded image depending on the degree of degradation for the blocks.

Still another aspect of the present disclosure provides, a control method of an image processing apparatus, the control method comprising: obtaining a degree of degradation for blocks in an encoded image obtained by encoding an input image; decoding the encoded image; and executing image recovery processing on a block in a decoded image obtained by decoding via the decoding, wherein in the executing image recovery processing, depending on the degree of degradation of the blocks in the encoded image, switches whether or not the image recovery processing using a first neural network is executed on each block in the decoded image.

Yet another aspect of the present disclosure provides, a non-transitory computer-readable storage medium comprising instructions for performing the control method of an image processing apparatus, the control method comprising: obtaining a degree of degradation for blocks in an encoded image obtained by encoding an input image; decoding the encoded image; and executing image recovery processing on a block in a decoded image obtained by decoding via the decoding, wherein in the executing image recovery processing, depending on the degree of degradation of the blocks in the encoded image, switches whether or not the image recovery processing using a first neural network is executed on each block in the decoded image.

According to the present invention, when image recovery processing is executed using a neural network after decoding, the amount of calculations involved in the recovery processing can be reduced.

DESCRIPTION OF THE EMBODIMENTS

First Embodiment

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the examples of an image processing system and an image processing apparatus described below, a digital camera capable of encoding and/or decoding images is used. However, the present embodiment is not limited to a digital camera and may be applied to other devices capable of encoding and/or decoding images. Such devices include, for example, a smartphone, a game console, a tablet terminal, a watch-type or glasses-type information terminal, a medical device, a surveillance camera system, an in-vehicle device, a server device, and the like.

Digital Camera Configuration

Figure 1:
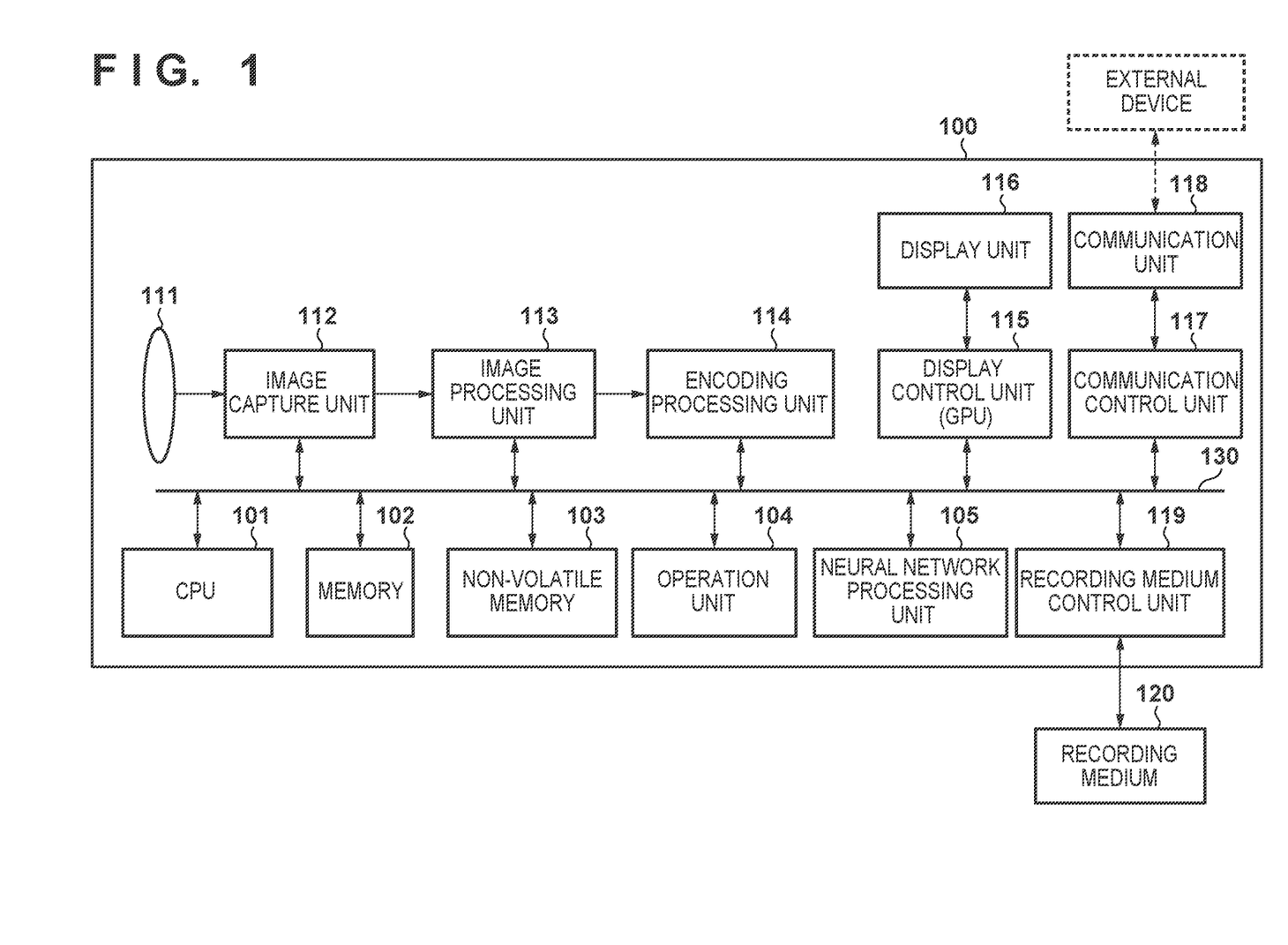
FIG. 1 is a block diagram illustrating a functional configuration example of a digital camera representing an image processing apparatus according to a first embodiment.

FIG. 1 illustrates a functional configuration of a digital camera 100. As illustrated in FIG. 1, the digital camera 100 includes a CPU 101, a memory 102, a non-volatile memory 103, an operation unit 104, and a neural network processing unit 105. The digital camera 100 further includes an image capture unit 112, an image processing unit 113, an encoding processing unit 114, a display control unit 115, and a display unit 116. Also, the digital camera 100 includes a communication control unit 117, a communication unit 118, a recording medium control unit 119, and an internal bus 130.

The digital camera 100 forms an optical image of a subject on a pixel array of the image capture unit 112 using an imaging lens 111. The imaging lens 111 may be undetachable or detachable from the body (case, main body) of the digital camera 100. Also, the digital camera 100 reads and writes image data on a recording medium 120 via the recording medium control unit 119. The recording medium 120 may be detachable or undetachable from the digital camera 100.

The CPU 101 deploys a computer program stored in the non-volatile memory 103 on the memory 102 and controls the operation of the units (functional blocks) of the digital camera 100 via the internal bus 130 by executing the computer program.

The memory 102 is a rewritable volatile memory. The memory 102 temporarily stores a computer program for controlling the operation of the units of the digital camera 100, information such as parameters relating to the operation of the units of the digital camera 100, information received by the communication control unit 117, and the like. Also, the memory 102 temporarily stores an image obtained by the image capture unit 112 and an image or information obtained via processing by the image processing unit 113, the encoding processing unit 114, and the like. The memory 102 is provided with sufficient storage capacity to store these programs, images, information, and the like temporarily. Furthermore, the memory 102 temporarily stores a computer program which describes the neural network processing contents and learned coefficient parameters such as a weighting coefficient, a bias value, and the like used by the neural network processing unit 105. Note that weighting coefficients are values indicative of the strength of the connection between nodes in the neural network, and bias values are values added to the weighting coefficient and the integrated value of the input data.

The non-volatile memory 103 is electrically erasable programmable memory, and EEPROM, a hard disk, or the like may be used. The non-volatile memory 103 stores a computer program for controlling the operation of the units of the digital camera 100, parameters relating to the operation of the units of the digital camera 100, and the like. The various operations executed by the digital camera 100 are implemented via the computer program. Note that a computer program which describes the neural network processing contents and learned coefficient parameters such as a weighting coefficient, a bias value, and the like used by the neural network processing unit 105 as described above may be stored in the non-volatile memory 103.

The operation unit 104 provides a user interface for operating the digital camera 100. The operation unit 104 includes various buttons, such as a power button, a menu button, a release button for image capture, a video recording button, a cancel button, and the like. The various buttons may be constituted by a switch, a touch panel, or the like. The CPU 101 controls the digital camera 100 in accordance with user instructions input via the operation unit 104. Note that in the example described herein, the CPU 101 controls the digital camera 100 on the basis of an operation input via the operation unit 104, however, no such limitation is intended. For example, the CPU 101 may control the digital camera 100 on the basis of a request input via the communication unit 118 from a non-illustrated remote controller, a non-illustrated portable terminal, or the like.

The neural network processing unit 105 executes processing by a neural network using the learned coefficient parameters obtained in advance by completing training. The neural network processing unit 105 includes a product-sum arithmetic circuit, internal memory, and a DMA controller. The neural network processing unit 105 executes a computer program which describes the neural network processing contents stored in the memory 102 or the non-volatile memory 103 or the internal memory. The product-sum arithmetic circuit of the neural network processing unit 105 is a circuit for product and sum calculations of the coefficient parameters described above. The internal memory of the neural network processing unit 105 temporarily stores a computer program which describes the neural network processing contents, learned coefficient parameters, intermediate data calculated by the product-sum arithmetic circuit, and the like. The DMA controller of the neural network processing unit 105 transfers data between the product-sum arithmetic circuit and the internal memory. Examples of the data transferred by the DMA controller include a computer program which describes the neural network processing contents, learned coefficient parameters, intermediate data calculated by the product-sum arithmetic circuit, and the like.

The neural network includes a deep neural network configuration including an input layer, an output layer, and a plurality of hidden layers. For example, the configuration may be a known neural network configuration including a convolutional neural network (CNN) and a fully connected layer. However, it goes without saying that the configuration of the neural network is not limited thereto. The coefficient parameters described above correspond to weighting and bias for each edge connecting nodes in each layer of the fully connected layer and correspond to weighting and bias of kernels in the CNN.

The neural network, for example, is trained to estimate a pre-encoding image using input data, which is an image encoded and decoded by a predetermined encoding technology and training data, which is an image prior to encoding. Accordingly, by using the coefficient parameters of the neural network after training, when decoded image data is input, the neural network estimates the pre-encoding image corresponding to the input image and outputs (i.e., a recovered image).

The imaging lens (lens unit) 111 is constituted by a non-illustrated lens group including a zoom lens, a focus lens, and the like, a non-illustrated lens control unit, a non-illustrated diaphragm, and the like. The imaging lens 111 is capable of functioning as a zoom unit that changes the angle of view. The lens control unit controls the focus adjustment, the f-number (F-value) via a control signal transmitted from the CPU 101. The image capture unit 112 sequentially obtains a plurality of image composing a moving image.

The image capture unit 112, for example, uses an area image sensor, such as a charge-coupled device (CCD), a complementary metal oxide semiconductor (CMOS), or the like. The image capture unit 112 includes a non-illustrated pixel array in which non-illustrated photoelectric conversion units that convert the optical image of the subject to an electrical signal are arranged in a matrix, i.e., two-dimensionally arranged. The optical image of the subject is formed on the pixel array via the imaging lens 111. The image capture unit 112 outputs the captured image as image data to the image processing unit 113 or the memory 102. Note that the image capture unit 112 is also capable of obtaining a still image.

The image processing unit 113 executes a predetermined image processing on the image data output from the image capture unit 112 or the image data read out from the memory 102. Examples of the image processing includes dynamic range conversion processing, interpolation processing, reduction processing (resize processing), color conversion processing, and the like. Also, the image processing unit 113 executes a predetermined arithmetic processing for exposure control, distance measuring control, and the like using the image data obtained by the image capture unit 112. The exposure control, the distance measuring control, and the like are executed by the CPU 101 on the basis of the calculation result obtained by the arithmetic processing by the image processing unit 113. Specifically, automatic exposure (AE) processing, auto white balance (AWB) processing, autofocus (AF) processing, and the like are executed by the CPU 101.

The encoding processing unit 114 encodes the image data (compresses the size of the image data) by executing intra-frame prediction encoding (intra-screen prediction encoding), inter-frame prediction encoding (inter-screen prediction encoding), or the like on the image data having undergone processing by the image processing unit 113. The encoding processing unit 114, for example, includes an encoding circuit constituted by a semiconductor element and the like. Note that the encoding processing unit 114 may be a system of compressing, via a predetermined irreversible compression system, RGB data output after processing by the image processing unit 113, the processing having a portion omitted.

The display control unit 115 may include a graphics processing unit (GPU), for example, and controls the display by the display unit 116. The display unit 116 is provided with a non-illustrated display screen. The display control unit 115 generates an image signal for display capable of being displayed on the display screen of the display unit 116 and outputs the image signal to the display unit 116. Also, the display control unit 115 is capable of outputting the image signal to an external device via the communication control unit 117 instead of outputting the image signal to the display unit 116. The display unit 116 displays the image on the display screen on the basis of the image signal output from the display control unit 115. The display unit 116 is provided with an on-screen display (OSD) function, which is a function for displaying a settings screen such as a menu on the display screen. The display control unit 115 is capable of outputting an image signal of an OSD image superimposed on the image data to the display unit 116. The display unit 116 is constituted by a liquid crystal display, an organic EL display, or the like and displays the image signal output from the display control unit 115. The display unit 116 may be a touch panel, for example. In a case where the display unit 116 is a touch panel, the display unit 116 is capable of functioning as the operation unit 104.

The communication control unit 117 controls the communication unit 118 to transmit video signals compliant with a communication protocol, such as High-Definition Multimedia Interface (HDMI) (registered trademark), Serial Digital Interface (SDI), and the like. The communication control unit 117 is controlled by the CPU 101. Also, the communication control unit 117 is capable of transmitting and receiving control signals that are not video signals.

The communication unit 118 converts video signals and control signals to a physical electrical signal and transmits and receives physical electrical signals with an external device. Note that the communication control unit 117 may be configured to generate a modulation signal compliant with a wireless communication protocol, such as IEEE802.11 and the like, output the modulation signal to the communication unit 118, and receive a modulation signal from an external device via the communication unit 118. Note that in this example, the transmission of a video signal and wireless communication is performed by the communication unit 118. However, the transmission and communication performed by the communication unit 118 is not limited thereto.

The recording medium control unit 119 controls the recording medium 120. The recording medium control unit 119 outputs, to the recording medium 120, a control signal to control the recording medium 120 on the basis of a request from the CPU 101. A non-volatile memory, a magnetic disk, or the like may be used as the recording medium 120. The recording medium 120 may be detachable or undetachable, as described above. The recording medium 120 records encoded image data and the like. The image data and the like as stored as files in a format compatible with the file system of the recording medium 120.

Access between the functional blocks 101 to 105, 112 to 115, 117, and 119 described above is possible via the internal bus 130.

Figure 2:
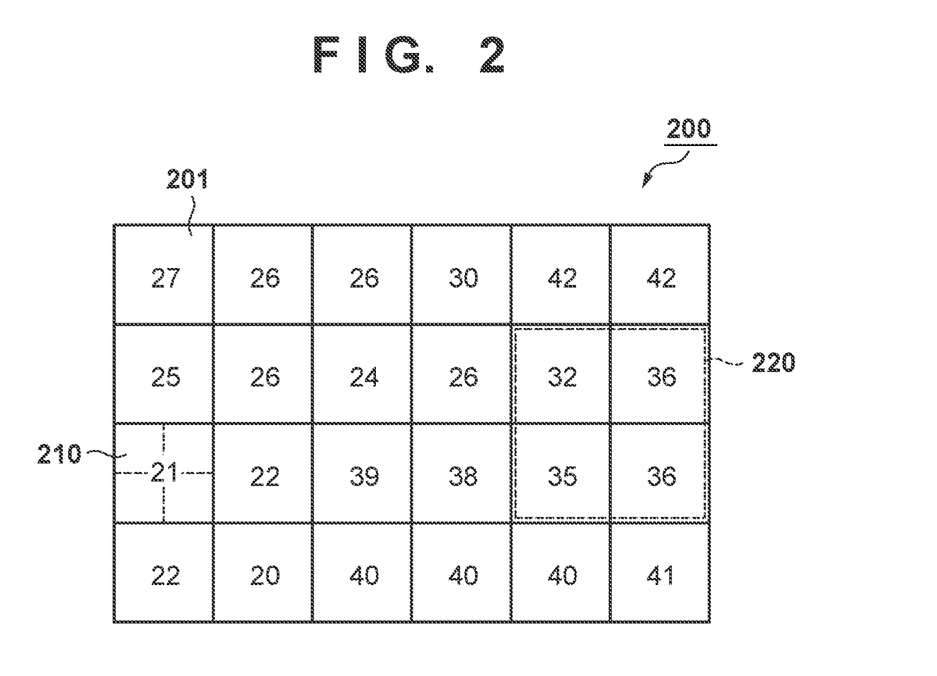
FIG. 2 is a diagram for describing an image block according to the first embodiment.

Next, the relationship between the input image and the blocks in the image when executing encoding will be described with reference to FIG. 2. As illustrated in FIG. 2, an image 200 (for example, image data from the image processing unit 113) is divided into blocks, which are units for encoding, (each block may also be referred to as an encoding block below) by the encoding processing unit 114. Note that in the example illustrated in FIG. 2, the blocks are divided into a block size similar to that of an encoding block 201. However, as long as the size is rectangular, the size may be asymmetrical. Also, for each encoding block, the encoding processing unit 114 sets a quantization parameter (Qp), which is a quantization parameter that determines the strength of quantization when quantization processing is executed. Furthermore, using the encoding blocks as a reference, the encoding processing unit 114 sets blocks (also referred to as NN blocks below) which are the unit on which the neural network of the neural network processing unit 105 executes processing. The NN block may be the same size of the encoding block 201 illustrated in FIG. 2, may be smaller than the encoding blocks like block 210, or may include a plurality of encoding blocks like block 220.

Encoding Processing Series of Operations

Figure 3:
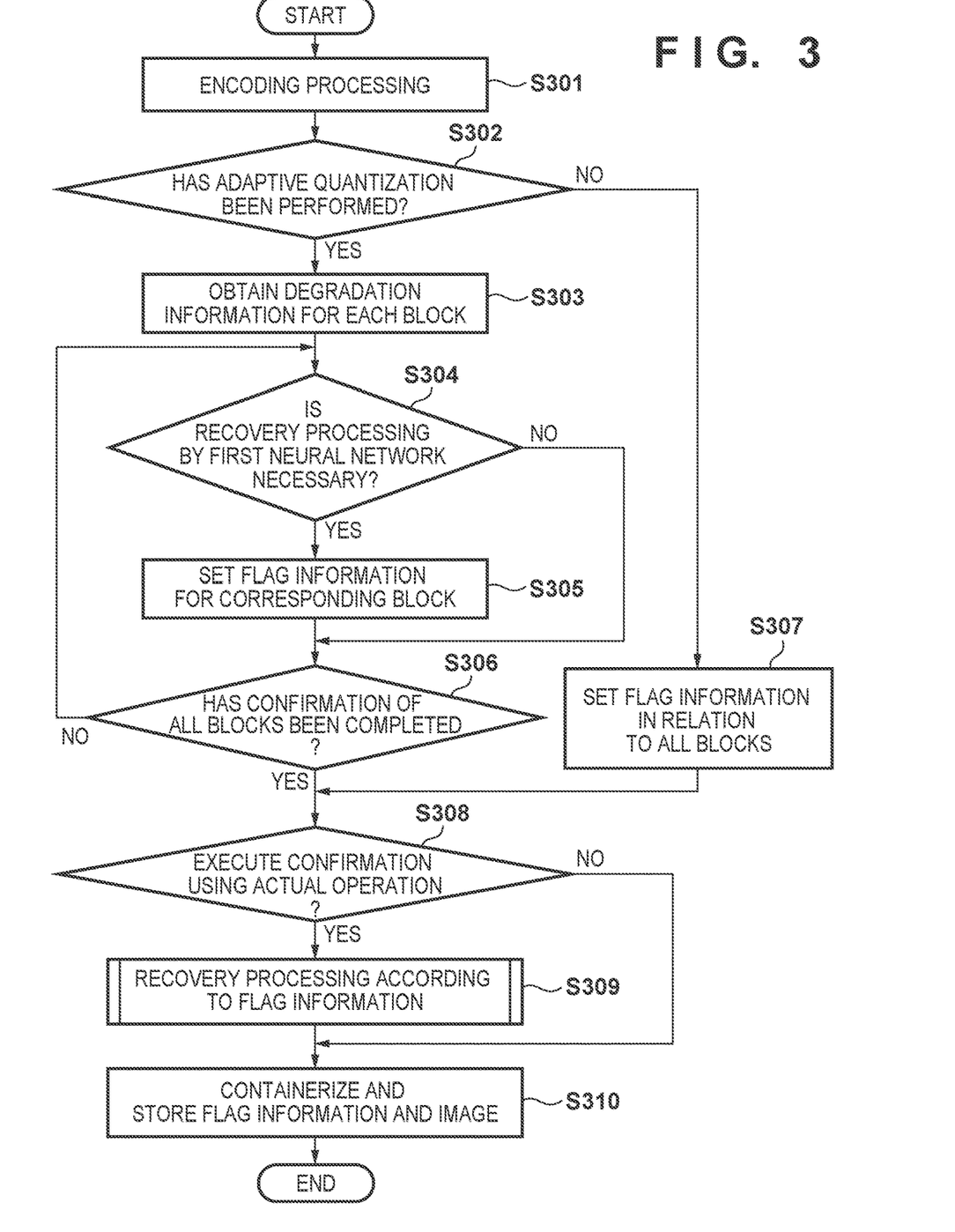
FIG. 3 is a flowchart illustrating a series of operations of encoding processing according to the first embodiment.

Next, a series of operations of the encoding processing according to the present embodiment will be described with reference to FIG. 3. In the present encoding processing, image data is encoded and flag information described below is recorded in a container. To implement the present operation, when the power of the digital camera 100 is on, a computer program stored in the non-volatile memory 103 is deployed on the memory 102 and the computer program in the memory 102 is read out and executed by the CPU 101.

In step S301, the CPU 101 controls the encoding processing unit 114 to execute encoding processing. The CPU 101 stores information indicative of whether or not adaptive quantization to change the Qp value for each block has been performed and encoded image data in the memory 102.

In step S302, the CPU 101 determines whether adaptive quantization has been performed. For example, the CPU 101 determines whether adaptive quantization processing has been executed on the basis of information, stored in the memory 102 in step S301, indicative of whether or not adaptive quantization has been executed. In a case where the CPU 101 determines that adaptive quantization has been executed (YES in step S302), the processing proceeds to step S303. In a case where the CPU 101 determines that adaptive quantization has not been executed (NO in step S302), the processing proceeds to step S310.

In step S303, the CPU 101 obtains degradation information indicative of the degree of degradation for each encoding block. Degradation information is the degree of degradation represented using the Qp value for each encoding block. For example, when the Qp value is low, the degree of degradation is low, and when the Qp value is high, the degree of degradation is high. Alternatively, the degree of degradation may be represented using the peak signal-to-noise ratio (PSNR). For example, the CPU 101 may calculate the PSNR by comparing the original image before encoding and the image data after encoding to the decoded image and use the PSNR as the information indicative of the degree of degradation. Note that when calculating the PSNR, the encoded image data needs to be decoded. In this case, the CPU 101 can execute decoding processing on the encoded image data before the processing of step S303.

In step S304, the CPU 101 determines whether or not image recovery processing has been executed for each of the NN blocks by the neural network (a first neural network). Note that in the example described herein, the first neural network processing is executed by controlling the neural network processing unit 105 of the digital camera 100. However, the processing may be executed by controlling a neural network processing unit of an external device. For example, the CPU 101 determines whether or not image recovery processing has been executed according to the degradation information of the encoding block/s included in the NN block for processing, depending on whether or not the degree of degradation in the degradation information is greater than a threshold. Note that in a case where the NN block includes a plurality of encoding blocks, a comparison of the average value or the highest value for the degree of degradation in the degradation information of the encoding blocks and a threshold is used in the determination. In a case where the CPU 101 determines that image recovery processing is necessary due to the degree of degradation being greater than the threshold (YES in step S304), the processing proceeds to step S305. In a case where the CPU 101 determines that the degree of degradation is equal to or less than the threshold (NO in step S304), the processing proceeds to step S306.

In step S305, the CPU 101 sets flag information indicative of whether or not recovery processing needs to be executed on the corresponding NN block. The CPU 101 sets, as flag information, 1 in a case where recovery processing is necessary and 0 in a case where recovery processing is not necessary. Note that as the information indicative of whether or not recovery processing is necessary, a degradation information value, such as the Qp value, the PSNR, or the like, may be used instead of the 0 or 1 flag. In such cases, for example, in a case where the degradation information value is greater than the predetermined threshold, the need for recovery processing may be indicated.

In step S306, the CPU 101 determines whether or not processing has been executed on all of the NN blocks. In a case where the CPU 101 determines that processing has been executed on all of the NN blocks (YES in step S306), the processing proceeds to step S307. In other cases (NO in step S306), the processing returns to step S304.

In step S307, the CPU 101 sets flag information indicative of recovery processing being needed to be executed on all of the NN blocks (in a case where adaptive quantization has not been executed).

In step S308, the CPU 101 determines whether or not to execute confirmation using an actual operation by executing actual image recovery processing via the first neural network. For example, the CPU 101 determines to not execute confirmation processing using an actual operation in a case where the image capture processing of the digital camera 100 is continuing and the processing of the neural network processing unit 105 is continuing. However, the CPU 101 determines to execute confirmation processing using an actual operation in a case where the processing of the neural network processing unit 105 is not continuing. In a case where the CPU 101 determines to execute confirmation processing by the first neural network (YES in step S308), the processing proceeds to step S309. In other cases (NO in step S308), the present processing proceeds to step S310.

In step S309, the CPU 101 executes recovery processing by the first neural network according to the flag information and executes confirmation processing of the flag information. The confirmation processing of the flag information will be described in detail below with reference to FIG. 4.

In step S310, the CPU 101 stores the flag information stored in the memory 102 and the encoded image data together in a container file and controls the recording medium control unit 119 to record these on the recording medium 120. For example, the format type of the container file may be exchangeable image file format (EXIF), high efficiency image file format (HEIF), MPEG-4 Part 14, or the like. When the CPU 101 records the flag information and the encoded image data on the recording medium 120, the present series of operations is ended.

Figure 4:
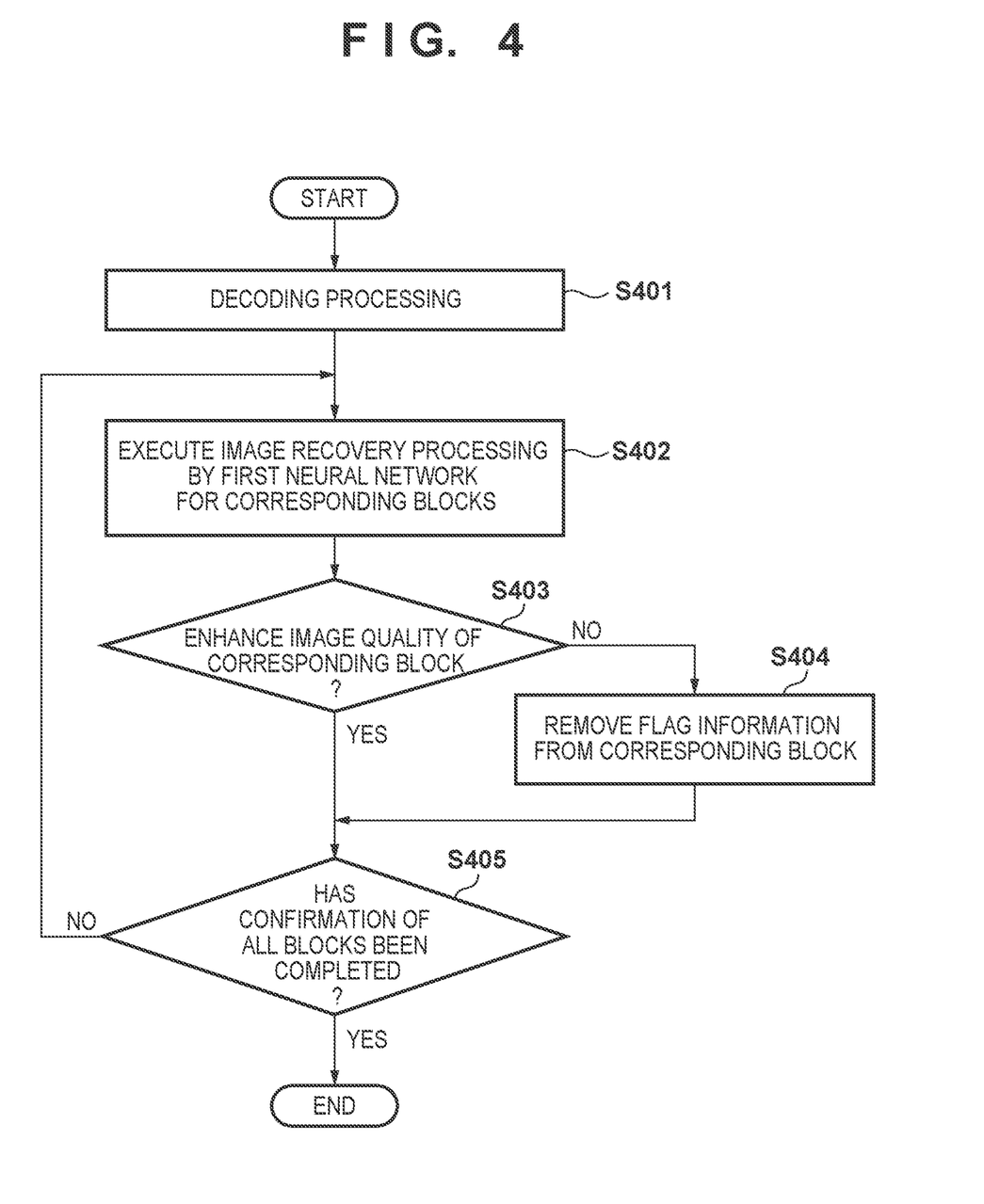
FIG. 4 is a flowchart illustrating a series of operations of confirmation processing of flag information accompanying image recovery processing according to the first embodiment.

Confirmation Processing of Flag Information Accompanying Image Recovery Processing Next, the process of executing confirmation processing of flag information accompanying the recovery processing by the first neural network will be described with reference to FIG. 4.

In step S401, the CPU 101 controls the encoding processing unit 114 to execute decoding processing on the encoded image data stored in the memory 102. Then, the CPU 101 stores the decoded image in the memory 102.

In step S402, the CPU 101, after obtaining the decoded image of corresponding NN block from the memory 102, controls the neural network processing unit 105 to execute image recovery processing. Herein, the corresponding NN block, for example, is an NN block with flag information set to 1 (in other words, set indicating that recovery processing is necessary).

In step S403, the CPU 101 determines whether to enhance image quality of the corresponding NN block. For example, the CPU 101 compares a first difference between the original image (input image) before encoded and the decoded image and a second difference between the original image and the image having undergone recovery via the recovery processing. In a case where the second difference is smaller than the first difference, it is determined to enhance the image quality. Alternatively, it may be determined whether a second PSNR calculated from the original image before encoding and the image having undergone the recovery processing in step S402 is greater than a first PSNR calculated from the original image before encoding and the decoded image. For example, in a case where the CPU 101 determines that the first PSNR is a greater value than the value of the second PSNR, the CPU 101 determines to enhance the image quality via a recovery processing (YES in step S403). In this case, the CPU 101 leaves the flag information as is, and the processing proceeds to step S405. On the other hand, in a case where the CPU 101 determines that the first PSNR is a value equal to or less than the value of the second PSNR (NO in step S403), the CPU 101 determines that the image quality will not be enhanced via image recovery processing, and the processing proceeds to step S404.

In step S404, the CPU 101 removes the flag information from the corresponding NN block. Alternatively, instead of removing the flag information, the CPU 101 may set the flag information to a predetermined value indicative of no effect or a value indicative of recovery processing being not necessary (i.e., 0). In other words, the CPU 101 can correct the information indicative of recovery processing being necessary as set in the flag information for each block depending on the effect of the recovery processing.

In step S405, the CPU 101 determines whether or not processing has been executed on all of the NN blocks. In a case where the CPU 101 determines that processing on all of the NN blocks has been executed (YES in step S405), the present series of operations is ended and the processing returns to the readout source (step S309). In other cases (NO in step S405), the processing returns to step S402.

Decoding Processing Series of Operations

Figure 5:
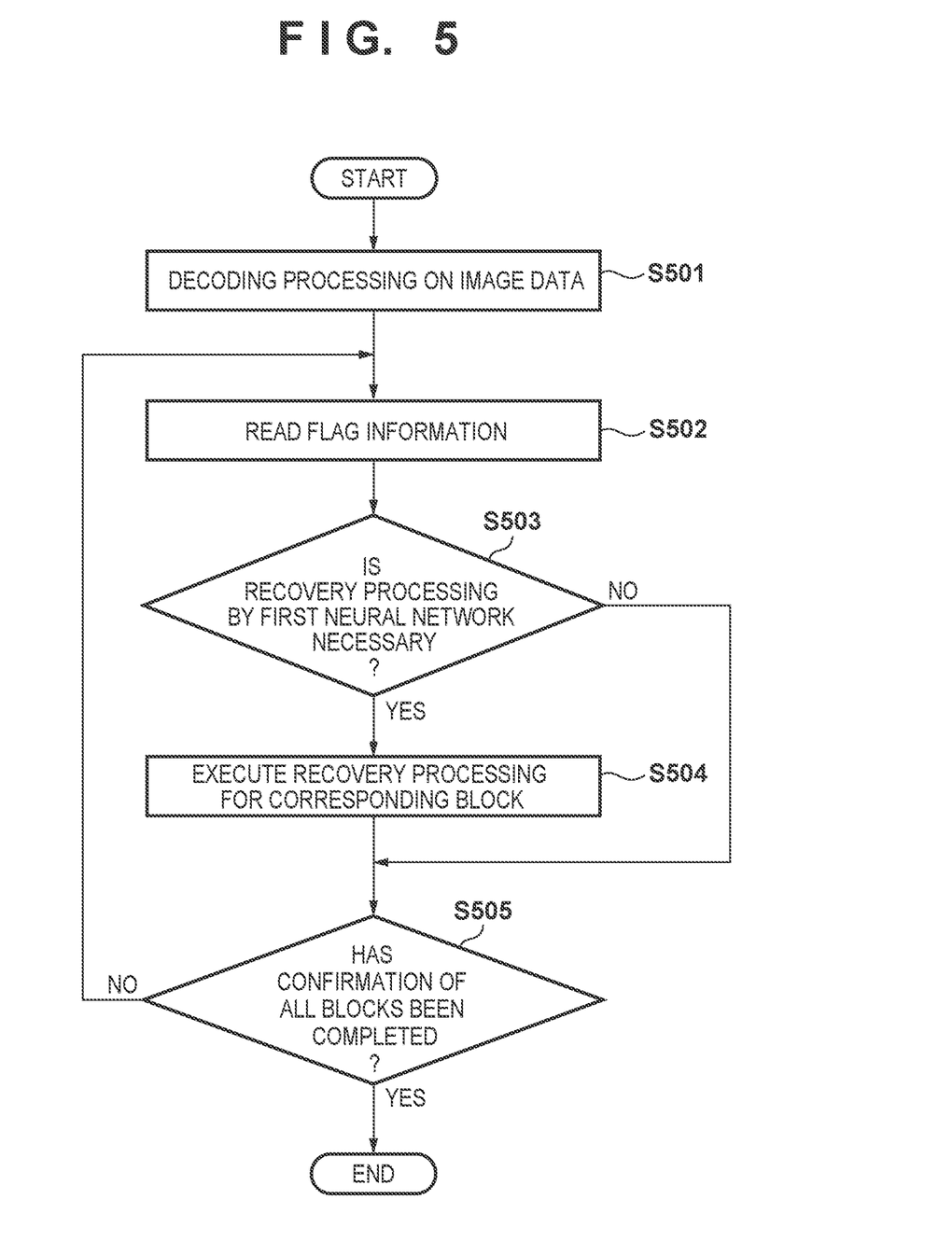
FIG. 5 is a flowchart illustrating a series of operations of decoding processing according to the first embodiment.

Next, a series of operations of the decoding processing according to the present embodiment will be described with reference to FIG. 5. To implement this operation, when the power of the digital camera 100 is on, a computer program stored in the non-volatile memory 103 is deployed on the memory 102 and the computer program in the memory 102 is read out and executed by the CPU 101. Note that in the present embodiment, the decoding processing is executed by the digital camera 100. However, the decoding processing may be executed by an external device that is not the digital camera 100.

In step S501, the CPU 101 controls the encoding processing unit 114 to execute decoding processing on the encoded image data. For example, the CPU 101 deploys the image data stored in the recording medium 120 on the memory 102 and controls the encoding processing unit 114 to execute decoding processing on the image data stored in the memory 102. The CPU 101 then stores the decoded image in the memory 102.

In step S502, the CPU 101 obtains flag information from the container of the recording medium 120 and stores it in the memory 102. In step S503, the CPU 101 determines whether or not recovery processing via the first neural network is necessary on the basis of the flag information obtained in step S502. In a case where the CPU 101 determines that recovery processing via the first neural network is necessary on the basis of the flag information (YES in step S503), the processing proceeds to step S504. In a case where, for example, the flag information is 1 indicating that recovery processing is necessary as described above, the CPU 101 determines that recovery processing via the first neural network is necessary. On the other hand, in other cases (NO in step S503), the CPU 101 proceeds the processing to step S505.

In step S504, the CPU 101 obtains from the memory 102 a decoded image of NN block with flag information indicating the recovery processing is necessary and executes image recovery processing by the neural network processing unit 105.

In step S505, the CPU 101 determines whether or not processing has been executed on all of the NN blocks. In a case where the CPU 101 determines that processing on all of the NN blocks has been executed (YES in step S505), the series of operations is ended. In other cases (NO in step S505), the processing returns to step S502.

In the present embodiment described above, the degree of degradation of the encoded image obtained by encoding the input image is set for each block in the image. Also, when the encoded image is decoded, whether or not recovery processing is executed using the neural network is switched depending on the degree of degradation for each block. This configuration allows recovery processing by the neural network processing unit to be executed on only the necessary sections when executing image recovery processing on the decoded image. In other words, when image recovery processing is executed using the neural network after decoding, the amount of calculations involved in the recovery processing can be reduced.

Second Embodiment

Next, the second embodiment will be described. In the first embodiment, confirmation processing of the flag information is executed by executing, via the first neural network, a recovery processing corresponding to the flag information. In the second embodiment, instead of this processing, confirmation processing of the flag information is executed corresponding to a determination of whether or not a recovery processing using a second neural network is necessary. Thus, the present embodiment is different from the first embodiment in that the neural network processing unit 105 includes the second neural network and that a portion of the operation according to the confirmation processing is different. However, the other configurations of the digital camera 100 according to the present embodiment and the operations of the encoding processing and the decoding processing are the same or essentially the same as in the first embodiment. Configurations and operations which are the same or essentially the same as in the first embodiment are given the same reference sign and the descriptions thereof are omitted. The differences will be focused on in the following description.

Figure 6:
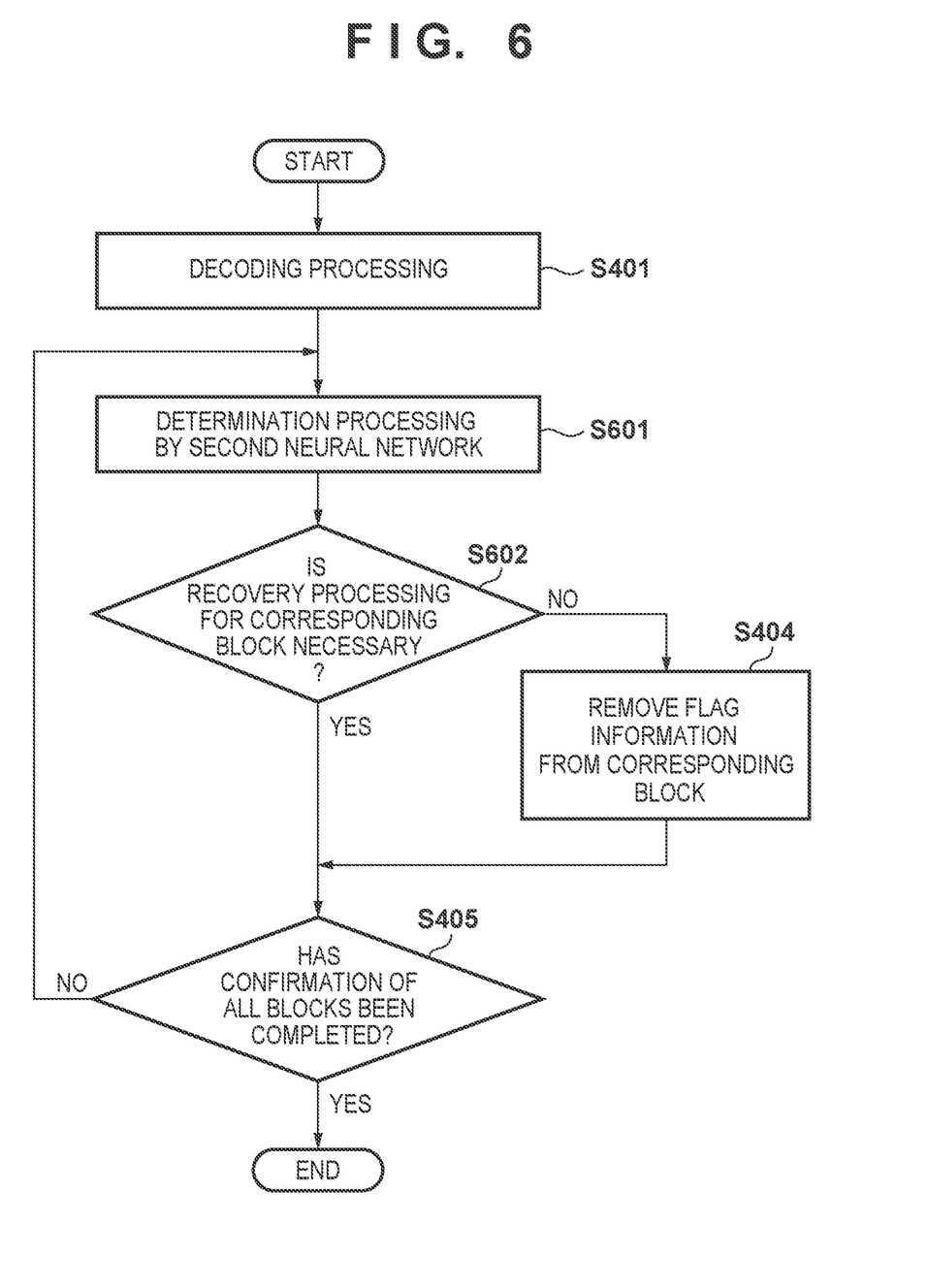
FIG. 6 is a flowchart illustrating a series of operations of confirmation processing of flag information according to a second embodiment.

Confirmation Processing of Flag Information Accompanying Image Recovery Processing The confirmation processing of flag information according to the present embodiment will be described with reference to FIG. 6.

In step S401, the CPU 101 executes decoding processing on the encoded image data. Next, in step S601, the CPU 101 obtains the decoded image of an NN block from the memory 102 and executes processing via the second neural network by controlling the neural network processing unit 105. The CPU 101 stores, in the memory 102, information relating to the priority for executing recovery processing on the NN blocks by processing via the second neural network. This priority information includes information indicative of the priority for executing recovery processing. Note that the second neural network includes input and output characteristics similar to that of the first neural network, but has a simplified network configuration compared to the first neural network. Thus, compared to executing processing to confirm the effectiveness of the recovery processing using the first neural network, estimating the priority via the second neural network allows for the confirmation of the necessity of recovery processing to be executed simply and quickly.

In step S602, the CPU 101 determines whether or not recovery processing is necessary for the corresponding NN block on the basis of the priority in the priority information obtained in step S601. Specifically, recovery processing is determined to be necessary or not depending on whether or not the priority indicated in the priority information is greater than a predetermined threshold. In a case where the CPU 101 determines that the priority of the corresponding NN block is greater than the predetermined threshold (YES in step S602), the processing proceeds to step S404. In other cases (NO in step S602), the processing proceeds to step S405. Note that instead of storing the priority information for each NN block, priority information obtained via the second neural network may be attached to the flag information of the NN blocks.

Thereafter, the CPU 101 executes step S405 as in the first embodiment, and, in a case where recovery processing is not necessary, instead of removing the flag information, the CPU 101 sets the flag information to a predetermined value indicative of no effect or a value indicative of recovery processing being not necessary (i.e., 0). Also, in step S405, in a case where confirmation of all of the blocks has been completed, the processing then returns to the call source.

In the present embodiment described above, confirmation of whether recovery processing on the corresponding block via the second neural network is necessary is executed. By the second neural network including input and output characteristics similar to that of the first neural network and having a simplified network configuration compared to the first neural network, processing can be executed quicker than in a case where the first neural network is used.

Third Embodiment

Next, the third embodiment will be described. In the embodiments described above, there were no restrictions to the number of flag information that could be set in a single image. Thus, when executing processing via the first neural network, the possibility of executing processing on the entire screen is not completely removed, and, depending on the image, processing may take a long time. In this case, if a restriction is placed on the processing time of a video or the like, playback delay may occur. In light of this, in the third embodiment, a restriction is placed on the number of settable flag information. Thus, the encoding processing is different from the embodiments described above, but the configuration of the digital camera 100 and the series of operations involving the decoding processing are the same or essentially the same as in the embodiments described above. Accordingly, redundant descriptions of the configurations and operations which are the same or essentially the same are omitted, and the differences with the embodiments described above will be focused on in the following description.

Encoding Processing Series of Operations

Figure 7:
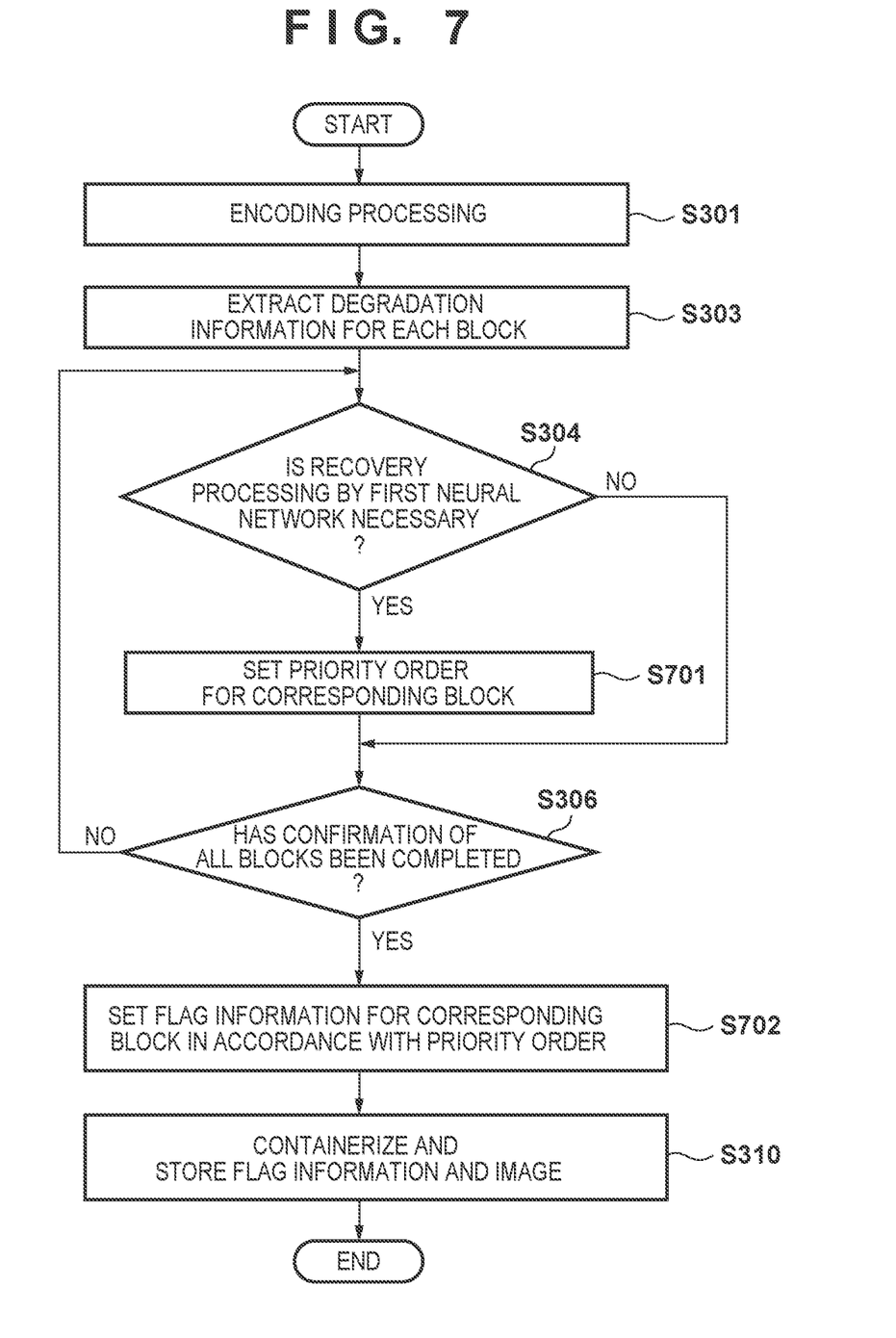
FIG. 7 is a flowchart illustrating a series of operations of encoding processing with a restricted number of flag information according to a third embodiment.

A series of operations of the encoding processing according to the third embodiment will be described with reference to FIG. 7. Note that to implement this operation, when the power of the digital camera 100 is on, a computer program stored in the non-volatile memory 103 is deployed on the memory 102 and the computer program in the memory 102 is read out and executed by the CPU 101.

In step S301, the CPU 101 controls the encoding processing unit 114 to execute encoding processing as in the first embodiment. Also, in step S303, the CPU 101 extracts degradation information of each block as in the first embodiment. Furthermore, in step S304, the CPU 101 determines whether or not image recovery processing has been executed for each of the NN blocks by the neural network (a first neural network) as in the first embodiment. In a case where the CPU 101 determines that image recovery processing via the first neural network is necessary (YES in step S304), the processing proceeds to step S701. In other cases (NO in step S304), the processing proceeds to step S306.

In step S701, the CPU 101 sets the priority order of the NN blocks for executing image recovery processing on the corresponding NN blocks using the first neural network. The CPU 101 sets a first priority order based on the order of the Qp values, for example. Also, the CPU 101 sets a second priority order for NN blocks with the same Qp value on the basis of the placement in the image. In the second priority order, the priority order is set increasing from the centrally located images. The CPU 101 stores priority order information set in this manner in the memory 102. Note that the method of setting the priority order of the present embodiment is an example, and the priority order may be set using a separately provided neural network or may be set on the basis of frequency components of the image.

In step S306, in a similar manner to the first embodiment, in a case where the CPU 101 determines that processing has been executed on all of the NN blocks (YES in step S306), the processing proceeds to step S702. In other cases (NO in step S306), the processing returns to step S304.

In step S702, the CPU 101 sets the flag information for a number of NN blocks able to be set with priority order up until an upper limit in accordance with the priority order information set in step S701. The upper limit number, for example, may be set as a predetermined proportion of the blocks able to be set in the image. Then, in step S310, the CPU 101 executes processing similar to that of the first embodiment. Thereafter, the present series of operations is ended.

In the present embodiment described above, a restriction is set to the number of blocks on which recovery processing via the neural network is executed for each block in the encoded image. In this way, a processing load caused by recovery processing being executed on all of the blocks in the encoded image can be minimized or prevented.

Note that in the embodiment described above, the types of processing described above are executed by the digital camera 100. However, no such limitation is intended. For example, in an example where the digital camera 100 is a system including a plurality of devices, functions similar to that of the embodiments described above can be implemented. Furthermore, at least one type of processing of the digital camera 100 can be executed and implemented by an external device on a network. Also, in the embodiments described above, the learned coefficient parameters are obtained from the memory 102 or the non-volatile memory 103. However, the learned coefficient parameters may be successively obtained from an external device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-009443, filed Jan. 23, 2020 which is hereby incorporated by reference herein in its entirety.

What is claimed is:

1. An image processing apparatus comprising:
   one or more processors; and
   a memory storing instructions which, when the instructions are executed by the one or more processors, cause the image processing apparatus to function as:
   an obtaining unit configured to obtain a degree of degradation for each of blocks in an encoded image obtained by encoding an input image;
   a decoding unit configured to decode the encoded image;
   a recovery unit configured to execute image recovery processing on a block in a decoded image obtained by decoding via the decoding unit; and
   a setting unit configured to set priority order of blocks for executing the image recovery processing on the blocks in the decoded image,
   wherein the recovery unit executes, on a block in which the priority order of the block is higher than a predetermined order and the degree of degradation of a corresponding block in the encoded image is higher than a threshold, the image recovery processing using a first neural network, the first neural network estimating an image of a corresponding block in a pre-encoding image from an image of the block in the decoded image.

2. The image processing apparatus according to claim 1, wherein the first neural network is trained to estimate a pre-encoding image from the decoded image using input data, which is an image obtained by encoding and decoding the input image via encoding technology, and training data, which is an image prior to encoding.

3. The image processing apparatus according to claim 1, further comprising an encoding unit configured to encode the input image,
   wherein the encoding unit, depending on the degree of degradation of the blocks in the encoded image, records flag information indicative of whether or not the recovery processing has been executed in a recording unit together with the encoded image.

4. The image processing apparatus according to claim 3, wherein the encoding unit encodes the input image using a quantization parameter and sets the degree of degradation using a value of the quantization parameter when encoding is executed.

5. The image processing apparatus according to claim 3, wherein the encoding unit executes adaptive quantization in encoding the input image.

6. The image processing apparatus according to claim 3, wherein the encoding unit records the flag information indicative of whether or not the recovery processing has been executed in a container file that is an EXIF or a HEIF type.

7. The image processing apparatus according to claim 1, wherein the degree of degradation is set using a value of a quantization parameter when encoding is executed; and
   in a case where the value of the quantization parameter is greater than a predetermined threshold, the degree of degradation of the corresponding block in the encoded image is higher than the threshold, and in a case where the value of the quantization parameter is equal to or less than the predetermined threshold, the degree of degradation of the corresponding block in the encoded image is not higher than the threshold.

8. The image processing apparatus according to claim 1, wherein the degree of degradation is set using a value of peak signal-to-noise ratio (PSNR) based on a pre-encoding image and a decoded image obtained by decoding a post-encoding image; and
   in a case where the value of the PSNR is greater than a predetermined threshold, the degree of degradation of the corresponding block in the encoded image is higher than the threshold, and in a case where the value of the PSNR is equal to or less than the predetermined threshold, the degree of degradation of the corresponding block in the encoded image is not higher than the threshold.

9. The image processing apparatus according to claim 1, wherein the recovery unit further includes a correcting unit configured to correct the degree of degradation for each of the blocks in the encoded image; and the correcting unit corrects the degree of degradation for each of the blocks in the encoded image on the basis of an output, output from a second neural network, of whether or not the image recovery processing is executed on each of the blocks.

10. The image processing apparatus according to claim 1, wherein the recovery unit further includes a correcting unit configured to correct the degree of degradation for each of the blocks in the encoded image; and the recovery unit compares a first difference between the input image and the decoded image and a second difference between the input image and an image recovered via the recovery unit and corrects the degree of degradation for each of the blocks in the encoded image according to whether or not the second difference is less than the first difference.

11. The image processing apparatus according to claim 1, wherein a number of blocks on which the image recovery processing is executed using the first neural network is restricted to a predetermined proportion of blocks able to be set in the image.

12. An image processing apparatus comprising:
one or more processors; and
a memory storing instructions which, when the instructions are executed by the one or more processors, cause the image processing apparatus to function as:
an encoding unit configured to output an encoded image obtained by encoding an input image;
a determining unit configured to determine a degree of degradation for each of blocks in the encoded image;
a setting unit configured to set priority order of blocks for executing image recovery processing on blocks in a decoded image obtained by decoding the encoded image; and
a recording unit configured to record, together with the encoded image, flag information indicative of whether or not the image recovery processing using a first neural network is executed on each of blocks in the decoded image depending on the degree of degradation of a corresponding block in the encoded image and the priority order of the block, wherein the first neural network estimates an image of a corresponding block in a pre-encoding image from an image of the block in the decoded image.

13. A control method of an image processing apparatus, the control method comprising:
obtaining a degree of degradation for each of blocks in an encoded image obtained by encoding an input image;
decoding the encoded image;
executing image recovery processing on a block in a decoded image obtained by decoding via the decoding; and
setting priority order of blocks for executing the image recovery processing on the blocks in the decoded image,
wherein the image recovery processing is executed, on a block in which the priority order of the block is higher than a predetermined order and the degree of degradation of a corresponding block in the encoded image is higher than a threshold, using a first neural network, the first neural network estimating an image of a corresponding block in a pre-encoding image from an image of the block in the decoded image.

14. A non-transitory computer-readable storage medium comprising instructions for performing the control method of an image processing apparatus, the control method comprising:
obtaining a degree of degradation for each of blocks in an encoded image obtained by encoding an input image;
decoding the encoded image;
executing image recovery processing on a block in a decoded image obtained by decoding via the decoding; and
setting priority order of blocks for executing the image recovery processing on the blocks in the decoded image,
wherein the image recovery processing is executed, on a block in which the priority order of the block is higher than a predetermined order and the degree of degradation of a corresponding block in the encoded image is higher than a threshold, using a first neural network, the first neural network estimating an image of a corresponding block in a pre-encoding image from an image of the block in the decoded image.

* * * * *